United States Patent [19]
Zweegers

[11] 4,056,923
[45] Nov. 8, 1977

[54] AGRICULTURAL IMPLEMENT

[76] Inventor: Petrus Wilhelmus Zweegers, Nieuwendijk 46, Geldrop, Netherlands

[21] Appl. No.: 651,975

[22] Filed: Jan. 23, 1976

[30] Foreign Application Priority Data

Feb. 4, 1975 Netherlands ..................... 7501290

[51] Int. Cl.² ..................... A01D 79/00; A01D 77/00
[52] U.S. Cl. ......................................... 56/366; 56/370
[58] Field of Search .................. 56/365, 366, 370, 377

[56] References Cited

U.S. PATENT DOCUMENTS

| | | | |
|---|---|---|---|
| 2,993,328 | 7/1961 | van der Lely et al. | 56/377 |
| 3,475,890 | 11/1969 | Purrer et al. | 56/370 |

Primary Examiner—Russell R. Kinsey
Attorney, Agent, or Firm—Edmund M. Jaskiewicz

[57] ABSTRACT

An agricultural implement for tedding, swath turning, hay collecting and similar operations. It comprises four rotors which rotate almost parallel to the ground and each of which carries series of outwardly directed tines. The four rotors may be alined transverse to the direction of motion, or they may be arranged according to a forwardly opening V or they may be arranged in a transport position in which the outer rotors are positioned practically in front of the inner rotors. Seen at the front of the implement, the two outer rotors always rotate toward one another, but the two inner rotors rotate away from one another in their first position and toward one another in their second position. This is obtained by swinging the pair of inner rotors over 180° about a central, common pivot. The frame comprises a rearwardly extending main frame beam, a reversible cross beam at its rear end carrying the inner pair of rotors and a pair of adjustable side arms carrying the outer rotors.

24 Claims, 5 Drawing Figures

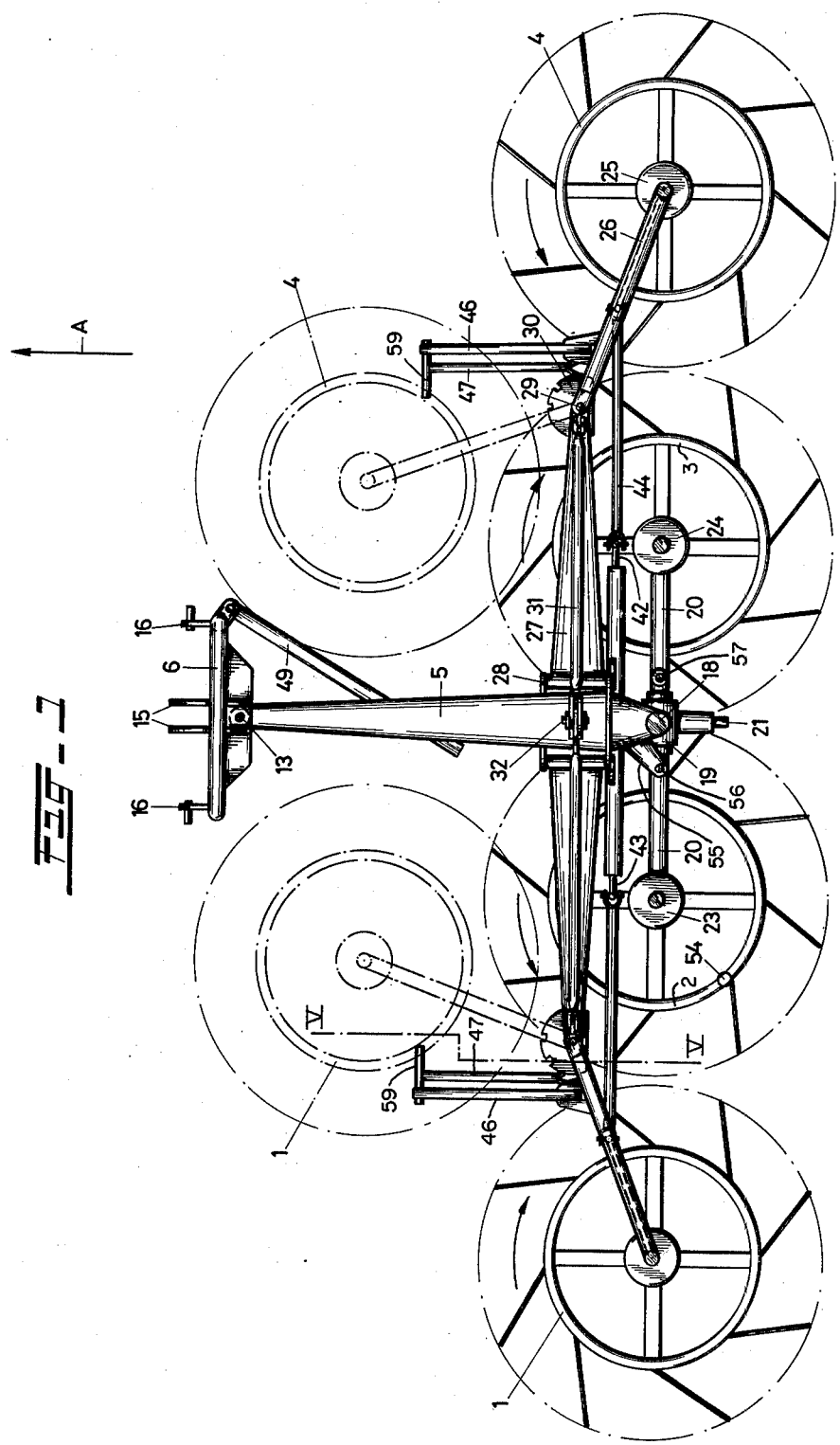

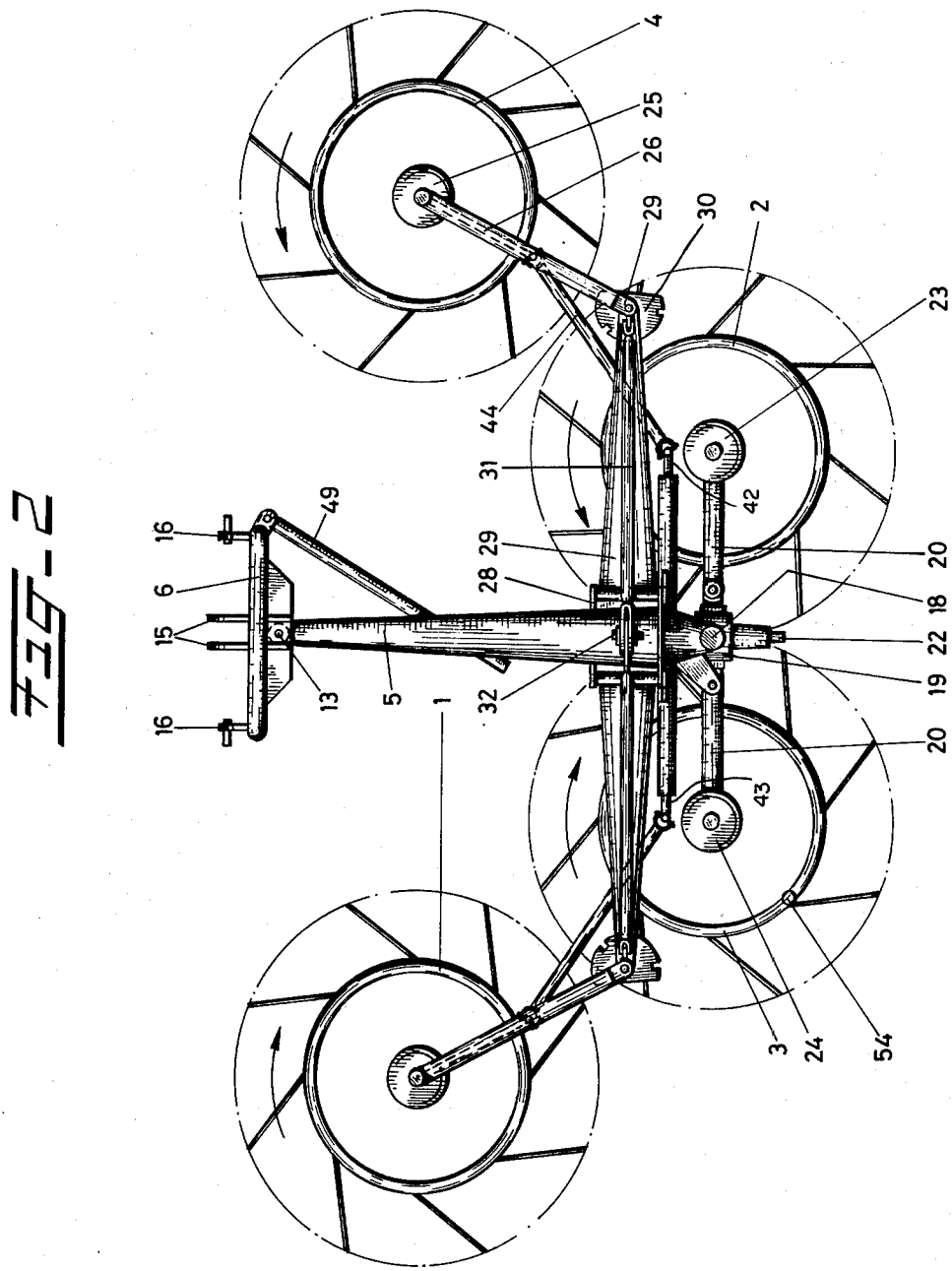

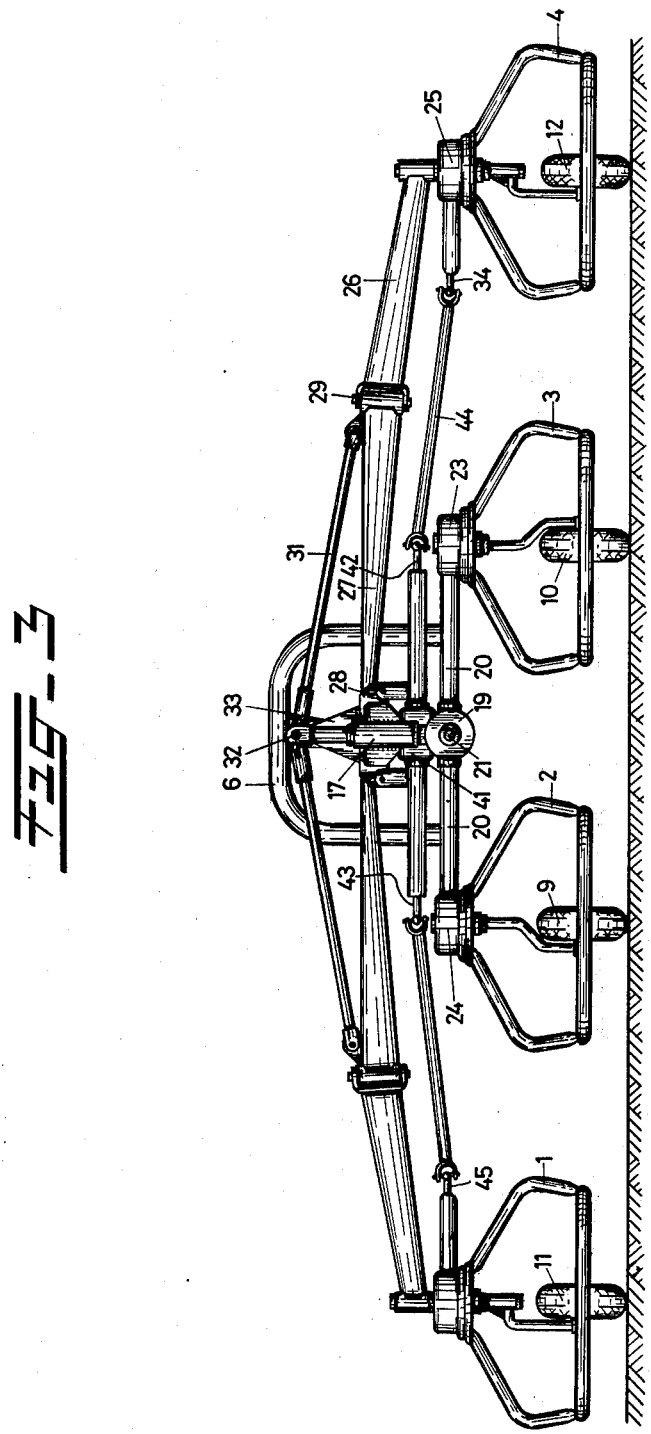

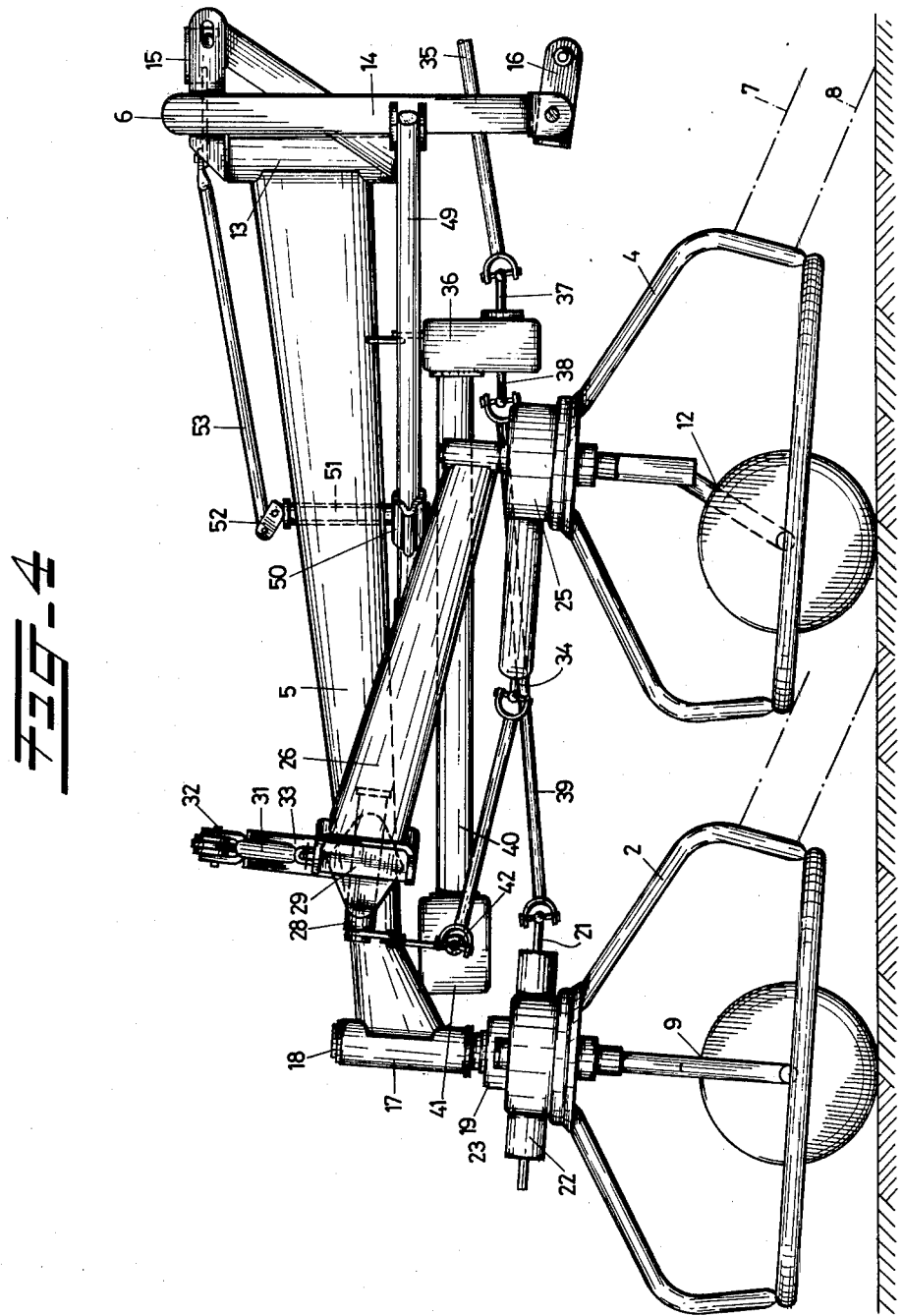

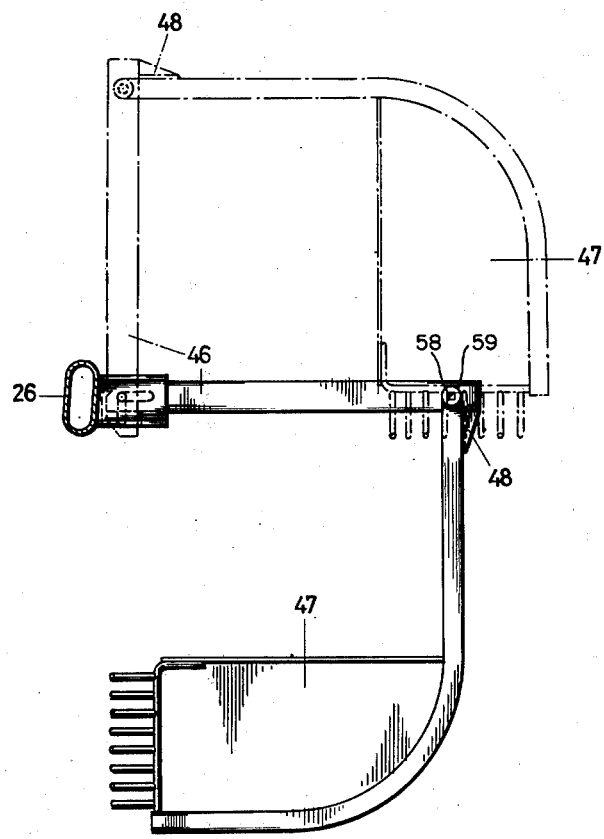

AGRICULTURAL IMPLEMENT

This invention relates to an agricultural implement comprising at least two tine carrying rake wheels rotatable about upstanding axes and mounted alongside one another to a frame transverse to the direction of motion of the implement.

So as to be able and carry out several different kinds of operation with such an agricultural implement, one has already proposed to make the direction of rotation of one or more rake wheels reversible.

It is an object of the invention to provide an implement in which this reversibility is obtained in an especially simple and efficient way.

This object is attained according to the invention in that two adjacent rake wheels are reversible as a unit as to directions of rotation.

In a preferred embodiment of the invention this is obtained in that the two adjacent rake wheels are connected to the frame by an intermediate, common connecting part which is rotatable over at least about 180°. Preferably, an additional rake wheel is or can be mounted at each side of the pair of rake wheels which are reversible as a unit to direction of rotation.

In the latter case, the directions of rotation of the two outer rake wheels are preferably directed towards each other at their front side. By reversing the direction of rotation of the two inner rake wheels as a unit by rotating them about their intermediate common connecting point, one obtains that in one of the two possible positions each inner rake wheel has the same direction of rotation as the adjacent outer rake wheel and in the other possible position each inner rake wheel rotates oppositely to the adjacent outer rake wheel. In the first case, the four rake wheels can, e.g., move the crop picked up over their full width, towards the centre of the implement, e.g., for forming a swath, whereas in the second case, each outer rake wheel cooperates with the adjacent inner rake wheel in a common pick-up of the crop over their full width, or in other words, they form two separate pairs of rake wheels which may, e.g., lay two swaths or ted and spread the crop picked up over the full width of the machine into two adjacent areas.

Moreover, the advantage is obtained that the direction in which the tines of the two inner rake wheels are loaded, is not changed when they are reversed as a unit, which is especially of importance for tines which should be loaded in only one direction.

The implement according to the invention is preferably provided with a main frame beam extending substantially in the direction of movement of the implement and carrying at its rear part an almost vertical, slightly forwardly inclined trunnion to which is fixed an auxiliary frame beam which extends to both sides transverse to the main frame beam such that the auxiliary frame beam can be rotated over at least about 180°, whereas each end of the auxiliary frame beam rotatably carries one of the two unitarily reversible rake wheels. The drive shafts of the two unitarily reversible rake wheels can be mounted inside the auxiliary frame beam and can be connected in the centre of the auxiliary frame beam to a common gearing which includes two driving stub shafts extending forwardly and rearwardly respectively from the auxiliary frame beam and being alternately connectable to the tractor power take-off, depending upon the position of adjustment of the auxiliary frame beam.

According to a further feature of the invention, the additional rake wheels mounted at both sides of the pair of reversible rake wheels are directly connected to the main frame beam via side arms.

Preferably, each side arm is connected to the main frame beam in a point positioned, in the direction of movement of the implement, in front of the trunnion of the pair of reversible rake wheels, via a pivot extending substantially in the direction of motion of the implement, but being slightly forwardly and downwardly inclined. The inclination of the pivot is preferably about 2.5° forwards and downwards with respect to the plane of rotation of the rake wheels.

In a prefered embodiment, a first part of each side arm extends, from its connecting pivot with the main frame beam, about normal to the latter, whereas a second part of the side arm is pivotally connected to the first part about a substantially vertical pivot axis and can be locked in several different positions of adjustment. Preferably, the shape and dimensions of the several parts are chosen so that in a position of adjustment in which both side arms are rearwardly inclined, the four rake wheels are alined and the operating circles of the tines of the two inner and the two outer rake wheels almost touch one another, whereas in a position of adjustment in which the two side arms are forwardly inclined, the four rake wheels assume positions according to a forwardly opening V and the operating circles of the tines of the two inner and the two outer rake wheels have a larger mutual spacing than in the first mentioned position of adjustment.

In a further position of adjustment, both outer rake wheels are swung so far forwardly and inwardly that the total width of the machine is within the width admissible for road transport.

Summing up, the invention provides an agricultural implement suitable for many different operations, having a simple construction and being adjustable in a simple manner for several operations and for road transport.

The invention will now be elucidated with reference to the accompanying drawings.

FIG. 1 is a top view of an embodiment of an implement according to the invention in a first operating position, the transport position being also shown in broken lines.

FIG. 2 is a top view of the implement according to FIG. 1 in a second position of operation.

FIG. 3 is a rear view of the implement in the position according to FIG. 1.

FIG. 4 is a side view of the implement in the position of FIG. 2.

FIG. 5 is a sectional view taken along the line V—V of FIG. 1 to show the shield in detail.

In the described embodiment of the implement, which is only given by way of example and which can be varied in many ways, the implement has four rake wheels 1, 2, 3, 4 which are connected in a way yet to be described to a main frame beam 5 extending substantially in the direction of motion of the implement and the front end of which is pivotally connected to the coupling frame 6 adapted to be fastened to the three point lifting device of an agricultural tractor.

In the position of adjustment according to FIG. 1, the four rake wheels 1, 2, 3, 4 are alined according to a line extending normal to the direction of motion of the implement (Arrow A in FIG. 1). Each rake wheel is rotatable about an almost vertical, slightly forwardly inclined axis and can be driven by the power take-off shaft of the tractor in a way yet to be described.

Each rake wheel is preferably constructed of tubes and is provided with outwardly extending resilient tines 7, 8 (see FIG. 4), which are preferably inclined at a small angle with respect to a plane normal to the axis of rotation of the appertaining rake wheel. The tines 7, 8 are preferably adjustable and lockable in several different positions with respect to the rake wheel as disclosed in U.S. Pat. Nos. 3,611,690 and 3,720,053 corresponding to the Netherlands applications Nos. 6910757 and 7000493. Since the axes of the rake wheels are somewhat forwardly inclined with respect to the vertical, the tines of the rake wheel touch the ground only at the front of the rake wheel, seen in the direction of motion of the implement.

Each rake wheel is supported in known manner by a ground wheel mounted underneath, the two inner rake wheels 2, 3 each being preferably provided with a ground wheel 9, 10 of fixed direction, whereas the two outer rake wheels 1, 4 are preferably provided with swingable ground wheels 11, 12. During movement of the implement, the main frame beam 5 with the ground wheels 9, 10 form a unit, pulled by the coupling frame 6 and being directionally adjustable about the pivot 13 of the coupling frame, whereas the two outer rake wheels 1, 4 with their swinging ground wheels 11, 12 follow these directional movements of the central unit 5, 9, 10 without difficulty.

The coupling frame 6 has an essentially known construction and mainly comprises a tube 14 of inverted U-shape, the top of which is provided in the centre with two lips 15 which are adapted to be connected to the top link of the three point lifting device of a tractor, whereas the lower ends of the U-shaped tube 14 are provided with short, forwardly directed, pivotable connecting pieces 16, both provided with a connecting trunnion for the two lower, lifting links of the three point lifting device. The tube 14 also carries the substantially vertical pivot 13 to which is coupled the front end of the essentially box shaped main frame beam 5 which extends rearwardly. The rear end of the main frame beam 5 carries a nearly vertical sleeve 17, which is preferably forwardly inclined at about 10° – 15°. This sleeve 17 contains a trunnion 18, the lower end of which carries a gear casing 19 which is unitary with a preferably tubular auxiliary frame beam 20 extending to both sides. From the casing 19 extend moreover two driving stub shafts 21, 22 which are forwardly and rearwardly directed respectively and extend thus oppositely from and normal to the auxiliary frame beam 20. The auxiliary frame beam 20 can be locked in two positions of rotation which are mutually 180° apart and in both of which it extends parallel to the connecting line of the axes of the four rake wheels as shown in FIG. 1. The beam 20 locking structure is shown in FIG. 1 and comprises on the frame 20 to the left of the pivot 18 a lug 55 and a pin 56 is inserted through a bore of this lug 55 into an open topped cup 57 welded on top of the beam 20. Although such a cup 57 is provided on the beam 20 at both sides of the pivot 18, only the cup 57 to the right of the pivot 18 is visible in FIG. 1, since the other cup is hidden under the lug 55. The operation of this device is apparent. After removing the pin or latch 56, the beam 20 may be rotated over 180° and the pin or latch 56 may be reinserted into the other cup 57 which has now come underneath it.

In one of these two positions, the driving stub shaft 21 is forwardly directed to be connected to the power take-off of the tractor, whereas in the other position of adjustment, the other driving stub shaft 22 is forwardly directed to be connected to the power take-off of the tractor. Inside the auxiliary frame beam 20, drive shafts extend from the gear casing 19 and are connected at one end with the driving stub shafts 21 and 22 and at the other end with a gearing mounted in a casing 23 or 24 respectively at the ends of the auxiliary frame beam 20. The rake wheels 2 and 3 are rotatably mounted to the underside of the gear casings 23 and 24. The gearing in the casing 19 is so designed that for one direction of rotation of the power take-off shaft of the tractor, the directions of rotation of the drive shafts in the auxiliary frame beam 20 are always the same, independent of the fact whether the stub shaft 21 or the stub shaft 22 is coupled to the power take-off of the tractor. The directions of rotation of the shafts in the auxiliary frame beam 20 are chosen so that the two rake wheels 2 and 3 always rotate oppositely to one another. Thus, in the position of adjustment according to FIG. 1, the left rake wheel 2 turns to the left and the right rake wheel 3 turns to the right, seen from above. However, when the auxiliary frame beam 20 with the gear casing 19 is rotated over 180° about the trunnion 18, one obtains the position according to FIG. 2, in which the position of the rake wheels 2 and 3 have been interchanged so that now the rake wheel 2, which rotates to the left, is positioned at the right, whereas the rake wheel 3, which rotates to the right, is positioned at the left.

Thus, as a consequence of this design, one may obtain by a simple rotation of the auxiliary frame beam 20 over 180° that the two inner rake wheels 2 and 3, seen at their front, rotate either toward one another, or away from one another. The two outer rake wheels 1 and 4 are fastened to the main frame beam 5 independently of the two inner rake wheels 2 and 3. Since the manner of fastening of the rake wheels 1 and 4 is mutually equal (but of course symmetric), only the fastening of the rake wheel 4 is further described. The tube construction of the rake wheel 4 is rotatably fastened to the underside of a gear casing 25, which is fastened to the outer end of a two-part side-arm 26, 27 the inner end of which is fastened to the main frame beam 5 by a pivot 28. The swing shaft of the ground wheel 12 of the rake wheel 4 extends through the gear casing 25. Under and about in the same plane as the part 26 of the two-part side-arm, a relatively long driving stub-shaft 34 extends from the gear casing and is adapted to be driven by the power take-off of the tractor in a way yet to be described. In the example described, the rake wheel 4 is always driven in the same direction.

The pivot 28 connecting the side arm 27, 26 with the frame beam 5 extends in the direction of motion of the implement when seen from above, but when seen from the side (FIG. 4) it is forwardly and downwardly inclined such that it is about 2.5° more downwardly inclined than a line which is perpendicular to the plane containing the two axes of rotation of the two inner rake wheels 2, 3. From this pivot 28, the first part 27 of the side arm extends substantially normal to the longitudinal plane of symmetry of the whole implement and it is connected at its outer end, via a substantially vertical pivot 29, to the second part 26 of the side arm, the outer end of which is connected to the gear casing 25. The axis of the pivot 29 crosses the axis of the pivot 28 perpendicularly when seen in side view, but when seen in rear view, the pivot 29 is about 2.5° outwardly and upwardly inclined. Under the pivot 29, a semicircular plate 30 is fastened to the outer end of the part 27 of the side arm, said plate comprising a plurality of notches in which a latch fastened to the outer part 26 of the side arm can be selectively engaged.

In the embodiment as described above, there are three positions of adjustment of the arm 26 with respect to the plate 30, namely the position shown in full lines in FIG. 1, the position shown in FIG. 2 and the position shown in broken lines in FIG. 1. For the embodiment described, these are the most important positions, but if desired, further positions of adjustment can be provided.

The position shown in FIG. 1 in broken lines is a transport position, in which the outer rake wheels 1 and 4 are swung inward so far that the total width of the machine is brought within the maximum width tolerated for road transport.

In the position shown in full lines in FIG. 1, all rake wheels 1, 2, 3, 4 have their axes of rotation in a common plane transverse to the direction of motion of the implement, whereas the two inner rake wheels are so adjusted that their front parts rotate away from each other.

In the embodiment described, the two outer rake wheels 1 and 4 always rotate towards each other at their front, so that in the position according to FIG. 1, the two left rake wheels 1 and 2 cooperate to feed the crop gathered at their front rearwardly in between them and to deposit it behind the machine, that is to spread it or to lay it in a swath. The pair of rake wheels 3 and 4 at the right side of the machine cooperate in the same way.

In this position of adjustment, the arm 26 is rearwardly inclined from the pivot 29 such that the operating circles of the tines of the rake wheels 3 and 4 or 1 and 2 respectively almost touch one another.

In the position of adjustment according to FIG. 2, the arm 26 is forwardly and outwardly inclined from the pivot 29 so that the rake wheel 4 is disposed in front of and outwardly of the adjacent rake wheel. The same is true for the pair of rake wheels at the left side of the machine. The adjustment of the two inner rake wheels 2, 3 is now such that they rotate toward each other at their front. Thus, all four rake wheels rotate in this position towards the centre at their front so that the crop gathered over the full width of the machine is fed toward the area between the two inner rake wheels 2, 3 so as to form one large swath. In this position of adjustment, the spacing between the outer rake wheel 4 and the adjacent rake wheel 2 is larger than in the position of adjustment according to FIG. 1, and it is so that there is a spacing in the order of about one half tine length between the operating circles of their tines.

It is moreover important that in all positions of adjustment of the outer rake wheels, their axes of rotation maintain the same inclination, that is about 10° to 15° forwardly with respect to the vertical. Just as the earlier mentioned spacings between the operating circles of the teeth of the inner and outer rake wheels, the latter condition is fundamentally obtained by the described inclinations of the pivots 28 and 29, and by the fact that the part 27 of the side arm extends substantially parallel to the common plane of the rotational axes of the two and at a certain spacing forward of inner rake wheels 2, 3. Although the mentioned conditions could in principle also be met in other manners, the described construction provides an easy and efficient manner for obtaining said conditions in the several positions of adjustment.

As stated, the main frame beam 5 with the rake wheels 2 and 3 and their ground wheels 9 and 10 form one unit when the implement is pulled, which unit can make lateral steering movements about the pivot 13 and which can also move somewhat in vertical direction to adapt itself to an uneven ground because of a limited amount of play in the three point lifting device. The lateral movements of the unit of main frame beam 5, rake wheels 2 and 3 and ground wheels 9 and 10 are positively followed by the outer rake wheels 1 and 4, since their side arms 27, 26 are fixed in lateral direction and the outer rake wheels 1 and 4 are provided with swinging ground wheels. However, in vertical direction, the outer rake wheels may follow an uneven ground because of the pivoting connection in vertical direction of the side arm 27 to the main frame beam 5 via the pivot 28. To limit these vertical adapting movements, a pivoting rod 31 is fastened to the outer part of the side arm 27 and its other end is fastened via an oblong hole to a pin 32 extending in the direction of motion of the implement and fastened to an upstanding part 33 of the main frame beam 5.

For driving the several rake wheels from the power take-off shaft 35 of the tractor, a distributor casing 36 is fastened under the main frame beam 5 and a stub shaft 37 protrudes from the front of this casing so as to be connectable to the power take-off shaft 35. Opposite to the stub shaft 37, another stub shaft 38 extends from the rear end of the distributor casing 36 and this stub shaft is connectable to the driving stub shaft 21 or 22 of the central pair of rake wheels 2, 3 via a usual extendable or telescoping intermediate shaft 39 comprising universal joints as known in the art. A further shaft within a tube 40 extends from the distributor casing 36 alongside and under the main frame beam 5 rearwardly to a second, rear distributor casing 41 also mounted underneath the main frame beam 5, relatively long stub shafts 42 and 43 respectively extending from both sides of the latter casing. The free end of the stub shaft 42 is connected to the driving stub shaft 34 of the gear casing 25 of the right, outer rake wheel 4 via a usual extendable or telescoping intermediate shaft 44 provided with universal joints as known in the art, and the other stub shaft 43 of the rear distributor casing 41 is connected to the driving stub shaft 45 of the other outer rake wheel 1 in a corresponding way. As stated, the directions of rotation of the driving shafts of the rake wheels 1 and 4 are chosen so that these rake wheels rotate always toward each other at their front. It should be noted that the drive of the outer rake wheels 1 and 4 from the distributor casing 41 permits movement of the rake wheels 1 and 4 in all directions and that this drive is further independent of the drive of the inner rake wheels 2 and 3.

It should be finally noted that the outer part 26 of the side arms carrying the outer rake wheels 1 and 4 carries a positionable and lockable supporting arm (FIG. 5) for a distributor shield 47 extending in the position according to FIG. 1 before and between the rake wheels of the pair 3, 4 or of the pair 1, 2 respectively in a manner known per se so as to equalize the feed of the crop in between the rake wheels of the relative pair. In the position according to FIG. 2, the supporting arms 46 are swung upwards and fastened (broken lines in FIG. 5) such that the distributor shields 47 are out of the operating area of the rake wheels. Since the distributor shields 47 are held against an abutment 48 of the supporting rod 46 by a relatively heavy torsion shaft 58 seen in FIG. 5, they can yield during operation, thus in the position according to FIG. 1, when the machine rides over an uneven ground, whereas they cannot rattle in the upwardly swung position according to FIG. 5, since they are pressed by force against the abutment 48.

It is further observed that the coupling frame 6 and the main frame beam 5 are additionally connected by a rod 49 fastened pivotally to the side of the frame 6, the rear end of said rod being slidably supported in a slit sleeve 50 connected to the main frame beam 5. A locking rod 51 engages the slit sleeve 50 from above such that when the locking rod 51 is pulled upwards, the sleeve 50 is clamped fast on the rod 49, whereas when the locking rod 51 is lowered, the rod 49 is left free to slide in the slit sleeve 50. The upper end of the locking rod 51 is engaged by a lever 52 which is operated by a rod 53 connected to the part 15 of the coupling frame. In operation, the rod 53 is in the rear position and the locking rod 51 is in the lower position, so that the lateral rod 49 can slide unobstructedly in the sleeve 50 and the implement can follow lateral steering movements by rotation about the pivot 13. However, when the three point lifting device is lifted, the part 15 pulls on the rod 53, the locking rod 51 is lifted and the rod 49 is clamped fast in the slit sleeve 50 so that the implement is not able anymore to make lateral movements with respect to the coupling frame 6 and it can be lifted from the ground without danger of sideward movement.

The rake wheels may, e.g., be of the type described in the Netherlands patent applications Nos. 6910757 and 7000493 as disclosed above. Accordingly, the tines 7, 8 are fastened via spring helices 54 so that they should be preferably loaded in one direction only, namely against the direction of rotation of the relative rake wheel. This condition is automatically met by the special reversing device according to the invention. If one would instead, e.g., in FIG. 1, reverse the direction of rotation of the rake wheel 2 separately of the reversal of the direction of rotation of the rake wheel 3, then one would not only obtain a wrong position of the tines (which might be corrected by adjustment of the tines) but one would also obtain a load of the tines in the wrong direction which would cause danger of breakage of the spring helices.

I claim:

1. Agricultural implement having a direction of travel and comprising means defining a frame extending transversely to the direction of travel, four adjacent positively driven tine-carrying rake wheels rotatable about substantially vertical axes on said frame means and disposed to define two inner and two outer wheels, means including the two inner wheels for defining a unit so mounted on said frame means as to be reversible such that either of said two inner wheels can occupy the position occupied by the other of said two inner wheels.

2. Agricultural implement as claimed in claim 1 wherein said unit comprises means interconnecting the two inner wheels, the center of said interconnecting means being pivotally connected to said frame means so as to be pivotable over an angle of at least 180°.

3. Agricultural implement as claimed in claim 1 wherein said two inner wheels have opposite directions of rotation, the forward portions of said two outer wheels with respect to the direction of travel rotating toward each other.

4. Implement according to claim 1 and further comprising a main frame beam extending substantially in the direction of motion of the implement and carrying a nearly vertical, somewhat forwardly inclined trunnion at its rear end, said unit comprising an auxiliary frame beam being fastened to said trunnion so as to extend to both sides transverse to the main frame beam and so as to be rotatable over at least about 180°, the end of the auxiliary frame beam rotatably carrying the two unitarily reversible rake wheels.

5. Implement according to claim 4 and comprising drive shafts to the two unitarily reversible rake wheels mounted inside the auxiliary frame beam and are connected centrally of said auxiliary frame beam to a common gearing which further comprises two driving stub shafts extending from the auxiliary frame beam forwardly and rearwardly respectively and each being alternately connectible to the power take-off shaft of a tractor, dependent on the position of adjustment of the auxiliary frame beam.

6. Implement according to claim 1 and comprising a main frame beam extending substantially in the direction of travel and side arms connected thereto, the outer rake wheels mounted at both sides of the pair of reversible rake wheels are mounted directly to the main frame beam by means of said side arms.

7. Implement according to claim 6, characterized in that each side arm is connected to the main frame beam in a point situated before the common trunnion of the pair of reversible rake wheels as seen in the direction of motion of the implement, via a pivot extending substantially in said direction of motion, but being somewhat forwardly and downwardly inclined.

8. Implement according to claim 7, characterized in that the inclination of said pivot with respect to the plane of rotation of the rake wheels is about 2.5° downwardly and forwardly.

9. Implement according to claim 8, characterized in that a first part of each side arm extends substantially normal to the main frame beam from its connecting pivot with said beam, and a second part of said arms is pivotally connected to said first part about a substantially vertical pivot axis and is lockable in several different positions of adjustment.

10. Implement according to claim 9, characterized in that in a position of adjustment in which both side arms are rearwardly inclined, the four rake wheels are alined, whereas in a position of adjustment in which both side arms are forwardly inclined, the four rake wheels are positioned according to a V opening to the front.

11. Implement according to claim 10, characterized in that in the first mentioned position of adjustment, the operating circles of the tines of the two inner and the two outer rake wheels almost touch one another whereas in the second position of adjustment, these operating circles have a greater mutual spacing.

12. Implement according to claim 9, characterized in that the two outer rake wheels can be swung forwardly and inwardly into a transport position.

13. Implement according to claim 9 characterized in that the forward inclination of the outer rake wheels remains substantially unaltered when said rake wheels are swung between their several different positions of adjustment.

14. Implement according to claim 13, characterized in that the axis of the outer pivot of the side arm, when viewed from the side, perpendicularly crosses the axis of the inner pivot of said same arm and, when viewed from the rear, is somewhat outwardly and upwardly inclined.

15. Implement according to claim 14, characterized in that the inclination of the outer pivot, when viewed from the rear, is about 2.5°.

16. Implement according to claim 1, characterized in that directionally fixed ground wheels are mounted under the two inner rake wheels and swingable ground wheels are mounted under the two outer rake wheels.

17. Implement according to claim 16, characterized in that the main frame beam extending in the direction of motion of the implement, together with the inner rake wheels and the ground wheels mounted thereunder, can swing laterally about its connecting pivot with the coupling frame during operation, but when the coupling frame is lifted, said lateral swinging possibility of the main frame beam is blocked.

18. Implement according to claim 17, characterized in that a rod is pivotally mounted to the side of the coupling frame so as to be able to slide in a sleeve fixed to the main frame beam, a latch acting on said sleeve and being so connected with the coupling frame that when the latter is lifted, the latch pushes the sleeve fast against the sliding rod so as to prevent further sliding thereof with respect to the sleeve.

19. Implement according to claim 7, characterized in that the up and down pivoting movement of the side arms of the outer rake wheels is limited for each side arm separately by a connection of an intermediate point of said arm with a point of the main frame beam located substantially above said pivot.

20. Implement according to claim 1, characterized in that the two outer rake wheels are driven by universally jointed shafts from a distributor casing connected to the main frame beam, said casing being adapted to be driven by the power take-off shaft of a tractor, separately from the drive to the two inner rake wheels.

21. Implement according to claim 9, characterized in that the outer parts of the side arms of the outer rake wheels each carry a positionable supporting rod for a distributor shield which may extend before and between an outer pair of rake wheels and which may be swung up into a position outside the operating area of the rake wheels.

22. Implement according to claim 1 wherein during operation, the tines of at least some of the rake wheels are slightly downwardly inclined with respect to a plane normal to the direction of rotation of the appertaining rake wheel.

23. Implement according to claim 22, characterized in that the tines of the rake wheels are fastened via spring helices, such that they can only take loads in a direction against the direction of motion of the rake wheel, by resilient yielding.

24. Implement according to claim 22 characterized in that the tines of the rake wheels are adjustable and lockable in several different positions.

* * * * *